(12) United States Patent
Kazmi

(10) Patent No.: US 8,270,340 B2
(45) Date of Patent: Sep. 18, 2012

(54) HANDLING OF IDLE GAP COMMANDS IN A TELECOMMUNICATION SYSTEM

(75) Inventor: Muhammad Ali Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 564 days.

(21) Appl. No.: 12/520,099

(22) PCT Filed: Dec. 7, 2007

(86) PCT No.: PCT/SE2007/050961
§ 371 (c)(1),
(2), (4) Date: Jun. 19, 2009

(87) PCT Pub. No.: WO2008/076063
PCT Pub. Date: Jun. 26, 2008

(65) Prior Publication Data
US 2009/0312023 A1     Dec. 17, 2009

(30) Foreign Application Priority Data
Dec. 19, 2006 (SE) ...................................... 0602769

(51) Int. Cl.
| H04B 7/185 | (2006.01) |
| H04B 7/212 | (2006.01) |
| H04B 17/00 | (2006.01) |
| H04W 4/00 | (2009.01) |
| H04W 24/00 | (2009.01) |
| H04J 3/00 | (2006.01) |
| H04L 12/28 | (2006.01) |
| H04L 12/56 | (2006.01) |

(52) U.S. Cl. ........ 370/318; 370/321; 370/330; 370/337; 370/426; 455/226.2; 455/423

(58) Field of Classification Search ....................... None
See application file for complete search history.

(56) References Cited

U.S. PATENT DOCUMENTS

| 2001/0022782 A1* | 9/2001 | Steudle ......................... 370/335 |
| 2003/0157952 A1* | 8/2003 | Sarkkinen et al. ............. 455/522 |
| 2003/0218995 A1* | 11/2003 | Kim et al. ..................... 370/318 |
| 2004/0166884 A1 | 8/2004 | Oh et al. |

(Continued)

FOREIGN PATENT DOCUMENTS
EP     1137203 A2     9/2001
(Continued)

OTHER PUBLICATIONS

3rd Generation Partnership Project. "Idle Gaps for Handover Measurement in E-UTRAN." 3GPP TSG-RAN WG2 Meeting #56, R2-063227, Riga, Latvia, Nov. 6-10, 2006.

(Continued)

*Primary Examiner* — Andrew Chriss
(74) *Attorney, Agent, or Firm* — Coats & Bennett, P.L.L.C.

(57) ABSTRACT

The invention relates to methods and arrangements for the reliability handling of idle gap commands received in a unit of a mobile telecommunication system. A user equipment located in a cell of a mobile telecommunication network receives signalling gap commands used to activate or deactivate idle gaps for downlink measurements in the neighbor cells. It is determined whether the received gap command is reliable or not. Downlink measurements are then performed in accordance with a predefined rule in case the received gap command is determined as unreliable.

52 Claims, 8 Drawing Sheets

U.S. PATENT DOCUMENTS

| | | | |
|---|---|---|---|
| 2004/0185808 A1* | 9/2004 | Chow | 455/127.2 |
| 2005/0042987 A1* | 2/2005 | Lee et al. | 455/67.11 |
| 2008/0076405 A1* | 3/2008 | Jen | 455/423 |
| 2008/0076427 A1* | 3/2008 | Huang et al. | 455/436 |

FOREIGN PATENT DOCUMENTS

| | | |
|---|---|---|
| KR | 20030073478 | 9/2003 |
| WO | 2006-081874 A1 | 8/2006 |

OTHER PUBLICATIONS

3rd Generation Partnership Project. "E-UTRA Intra-frequency Measurement Configuration and Control." 3GPP TSG-RAN WG2 Meeting #56, R2-063228, Riga, Latvia, Nov. 6-10, 2006.

* cited by examiner

HANDLING OF IDLE GAP COMMANDS IN A TELECOMMUNICATION SYSTEM

TECHNICAL FIELD

The present invention relates to methods and arrangements in a telecommunication system, in particular to methods and arrangements for the reliability handling of idle gap commands received in a unit of a mobile telecommunication system.

BACKGROUND

Universal Terrestrial Radio Access Network (UTRAN) is a conceptual term that identifies that part of the network which consists of Radio Network Controllers (RNCs) and Node Bs. This communication network is commonly referred to as 3G. Evolved UTRAN (E-UTRAN) is an evolution of the 3G radio access network towards a high-data rate, low-latency and packet-optimised radio access network.

As stated in the document 3GPP TR 25.913 "Requirements for Evolved UTRA (E-UTRA) and Evolved UTRAN (E-UTRAN)" issued by the 3rd Partnership Project (3GPP), an evolved UMTS Terrestrial Radio Access Network (E-UTRAN) is supposed to support the mobility of user equipments (UE) within different E-UTRA carrier frequency layers and also to support the mobility between E-UTRAN and legacy technologies (such as UTRAN and GERAN). In order to realize such mobility scenarios, the UE should be able to perform downlink measurements on other frequency or other access technologies without significant performance degradation. These types of measurements (i.e. outside serving frequency layer or outside intra frequency) are performed during idle gaps. An idle gap implies a time period that the UE for instance can use for performing such measurements. When performing measurements, the UE does not receive or transmit any data or signaling information.

Idle gap patterns can be scheduled in the following ways:
Static idle gaps
Fully dynamic periodic gaps
Semi-dynamic periodic gaps In static idle gap patterns the network configures all the associated parameters at the time of measurement configuration. In this approach the gaps occur periodically. The periodic pattern is used throughout the measurement until modified by higher layer signaling. The UE will not be scheduled during the gaps instead it will perform the requested measurements.

Dynamic idle gaps are generally created through negotiation between UE and Node B.

In semi-dynamic gap allocation the gap pattern is initially assigned to the UE at the start of each measurement via RRC signaling in a Measurement Control message. But during the course of the measurement the gaps can be altered by sending short commands. The network can send information to the UE to indicate whether the UE shall consider the gap pattern to be on or off. When the gap pattern is off the UE may be scheduled during the gap pattern and so will not use the gap to perform measurements. On the other hand when the gap pattern is on, the UE will not be scheduled and so can perform measurements during the gaps.

Most user equipments have single receiver chain, which can operate on a single carrier frequency at a time. Therefore, in E-UTRAN the UE can perform neighbour cell measurements without idle gaps on the neighbour cells belonging to the serving carrier frequency provided these cells are well aligned in the frequency domain.

Generally, cell identification and handover measurements that are carried out on cells operating on a carrier frequency outside the serving frequency layer, i.e. on inter-frequency, require idle gaps. In E-UTRAN the following categories of handovers will require a UE to perform neighbour cell measurements with idle gaps:

Handovers to E-UTRA inter-frequency cells, Frequency Division Duplex (FDD);
Handovers to E-UTRA inter-frequency cells, Time Division Duplex (TDD);
Handovers to UTRA Frequency Division Duplex (FDD) cells;
Handovers to UTRA Time Division Duplex (TDD) cells;
Handovers to GSM Edge Radio Access Network (GERAN) cells;
Handovers to non 3GPP technologies, e.g. CDMA2000, Mobile Wimax, etc.

During an idle gap the UE tunes its receiver to another E-UTRA carrier frequency or to a carrier frequency of another access technology (e.g. UTRA or GERAN) for performing the neighbour cell measurements and/or cell identification. The more general term measurements is used which implies neighbour cell measurements as well as cell identification. It should be noted that in order to be able to perform neighbour cell measurements, the UE should first identify the cell. The neighbour cell measurements are performed on identified neighbour cells. While performing such measurements the UE does not receive or transmit any data or signaling information on the serving E-UTRA carrier frequency.

It is likely that at least some sort of semi-dynamic idle gaps will be used in E-UTRAN. In a semi-dynamic idle gap pattern assignment one or more gap patterns are initially assigned (or pre-configured) to the UE at the time of measurement configuration via higher layer signalling such as radio resource control (RRC). During the course of measurement the gaps can be activated or deactivated by sending short and fast commands, typically "on"/"off"-signals, that are sent on a shared control channel (e.g. L1/L2 control) as proposed in the document 3GPP TR 25.814 "Physical layer aspect for Evolved Universal Terrestrial Radio Access (UTRA)". The commands are sent just prior to the start of gaps. Even if static idle gaps are used, on/off commands can still be used for activating or deactivating an entire gap pattern, i.e. to start or stop the idle gap pattern. Irrespective of the gap pattern type, the on/off commands can also be used at the very beginning, or activation, of the pattern and for terminating the pattern when measurements are over. It should be noted that the conventional way of activating or deactivating the entire pattern is via Radio Resource Control (RRC) signalling, whereby the drawback is that it is slow and therefore may cause performance degradation.

The main advantage of the "on"/"off"-commands is to provide flexibility to the scheduler since it can schedule users during the gaps if resources are available, if the quality of service is to be met, and if there is sufficient traffic in the buffer. Another main advantage is that HARQ (Hybrid Automatic Repeat Request) initial transmission and especially retransmissions would not be delayed due to measurements during the gap.

As shown in FIG. 6, each pre-configured idle gap pattern is characterized by a start sub frame number (SSSFN), an end sub frame number (ESSFN), and an inter-gap length (IGL). The typical gap length can vary between 2 ms and 10 ms duration. The gap pattern can be configured for a limited duration but also for infinite amount of time, i.e. until the end of the session. During an idle gap the UE can perform downlink measurements unless forbidden by the network via shared control channel (L1/L2 control) as explained above. In case a measurement is not allowed, e.g. by a gap "off"-command, the UE expects to be scheduled for data transmission.

| Shared control channel field | Interpretation | Action |
|---|---|---|
| 0 | Gap ON | Perform measurement only |
| 1 | Gap OFF | Skip measurement, receive/transmit data |

The table illustrates an example of the connotation of gap commands and how gap commands can be interpreted. This, however, is purely a matter of definition; alternative approaches could define, for instance, the values 0 and 1 to be specified as gap "off" and gap "on", respectively.

One particularly important issue in transmissions is the reliability. I.e. the entire decision process relies upon one or more simple commands, such as the "on"/"off"-signalling, up and down commands, etc. Thus, unreliable commands may cause actions to occur in reverse direction and in some cases may lead to unstable behaviour. Unreliabilities where a receiver cannot properly interpret the correct meaning of a received command generally occur due to bad radio conditions, low transmitted power level, poor coverage, high system load, etc. FIG. 7 illustrates an example in which an unreliable gap command leads to a missed HARQ transmission.

To ensure reliable operations, four sets of functionalities should be specified:
Reliability check;
Behaviour or action of UE and/or base station;
Indication or reporting of unreliability events to network;
Prevention of unreliability.

The reliability check can be based either on some signal strength or quality thresholds. It can also be based on some bit error rate (BER) target value. This means a received command is regarded as unreliable in case the received signal quality or strength falls between the thresholds or if the BER is higher than the target.

The behaviour of UE or base station in response to unreliable command detection depends upon a particular functionality governed by the on/off command. This is described with the following examples from UTRAN:

Assuming for instance TPC commands ("on"/"off"-type signalling) as used in WCDMA for inner loop power control in a soft handover scenario. The UE is supposed to regard the UL TPC command (received on the downlink) as unreliable in case TPC command error rate exceeds a certain threshold, e.g. 30%. The immediate action or behaviour of the user equipment is to disregard such a command when combining TPC commands in soft handover from more than one radio link sets. Both reliability check and UE actions are generally mandated by a suitable test case as is the case with TPC combining.

Another example relates to the UE behaviour in case of unreliable scheduling grants in E-DCH transmission. An unreliable up- or down-command is treated as a hold command by the UE. This means that the UE in case of a detected unreliable grant will neither increase nor decrease its current transmitted rate. This well specified behaviour ensures that a UE shall not transmit with unnecessary higher power because this would otherwise increase the noise rise at the base station.

In order to eliminate the unreliable behaviour, the network needs to take some corrective actions (such as increasing power level, performing congestion control, doing handover, etc.), which is generally possible if the network is made aware of the 'unreliable' behaviour, preferably by reporting 'successive unreliable occurrences'.

Reliability of the received commands can be improved by using redundant bits (e.g. sending 000 and 111 for 0 and 1 respectively). But this is not sufficient as this is almost always done (e.g., 2 or more bits per TPC command) but still UE behaviour needs to be specified since redundant bits may also become unreliable.

SUMMARY

Hence, the gap commands sent via shared control channel signalling may be unreliable due to poor radio conditions, insufficient transmit power setting, or, if the user is in the cell border region, inter-cell interference. If, in such situations, an unreliable gap "off"-command is interpreted incorrectly, there will arise two problems: first, the UE will miss the scheduling commands on the shared control channel and the corresponding data sent on DL-SCH on the serving E-UTRA carrier frequency. This will obviously delay the HARQ transmissions and retransmissions. Second, downlink resources, which contain scheduling command and the data on the DL-SCH, will be wasted.

Thus, it is an object of the invention to decrease unstable behaviour in the network due to incorrect interpretation of gap commands.

According to a first aspect of the invention a method in a user equipment located in a cell of a mobile telecommunication network is provided. The method comprises the step of receiving signalling gap commands used to activate or deactivate idle gaps for downlink measurements in the neighbour cells. The signalling gap commands may be MAC level gap on/off commands indicating whether or not the user equipment can use the gap for measurements. According to the method it is first determined whether the received gap command is reliable or not. Then, downlink measurements are performed in accordance with a predefined rule in case the received gap command is determined as unreliable.

A second aspect of the invention provides a method in a radio base station in a cell of a mobile telecommunication network. The method comprises the steps of configuring idle gaps in a user equipment in the cell for downlink measurements, and sending gap commands indicating whether the user equipment should receive data or perform downlink measurement during the corresponding gap. The method also comprises the step of configuring a user equipment for specifying a predetermined behaviour when the received gap commands are unreliable.

According to a third aspect of the invention a user equipment located in a cell of a telecommunication network is provided. The user equipment is equipped for receiving signalling gap commands used to activate or deactivate idle gaps for downlink measurements on the neighbour cells. The user equipment comprises means for determining whether the received gap command is reliable or unreliable. Furthermore, it comprises means for performing downlink measurements in accordance with a predefined rule, in case the received gap command is determined as unreliable. The means utilised according to this third aspect, such as antenna and radio equipment, are all standard user equipment components well known to a person skilled in the art. Also, the means for performing downlink measurements in accordance with a predefined rule could be partly be implemented by for instance software that is run on one or more processors in the user equipment. Alternatively it could possibly be implemented by hardware, such as one or more ASICs.

A fourth aspect of the invention provides a radio base station in a cell of a mobile telecommunication network. The radio base station comprises means for configuring idle gaps in a user equipment in the cell for downlink measurements. It also comprises means for sending gap commands indicating whether the user equipment should receive data or perform downlink measurement during the corresponding gap. Furthermore, it comprises means for configuring a user equipment for specifying correct behaviour when the received gap commands are unreliable. The means utilised according to this fourth aspect, such as antenna and radio equipment, are all standard radio base station components well known to a person skilled in the art. Software run on e.g. a processor in the radio base station could be used for logical operations, such as how to configure the idle gaps and how to specify correct behaviour when the gap commands are unreliable.

A fifth aspect of the invention provides a method in a radio base station in a cell of a mobile telecommunication network. The method comprises the steps of configuring idle gaps in a user equipment in the cell for downlink measurements, and sending gap commands indicating whether the user equipment should receive data or perform downlink measurement during the corresponding gap. The method also comprises the step of configuring a user equipment for specifying correct behaviour when the received gap commands are unreliable. Furthermore, the method comprises the step of configuring a user equipment to be able to report results or events pertaining to unreliable commands. It also comprises the step of performing one or more actions to improve the reliability of the received gap commands in response to the results or events reported by the user equipment. Finally, it comprises the steps of autonomously detecting that the transmitted gap commands are received unreliably by the user equipment without explicit reports from the user equipment and performing one or more actions to improve the reliability of the transmitted gap commands.

According to a first embodiment the predetermined rule and predetermined behaviour imply that the UE assumes that the next gap is "off", whereby it omits the gap (i.e. it does not perform any measurements) and waits to be scheduled.

According to a second embodiment the predetermined rule and predetermined behaviour imply that the UE also assumes that the next gap is initially "off" but after an expiration of a timer (starting from start of the gap) it may perform measurement during the remaining gap provided it has not received any data.

According to yet another embodiment the predetermined rule and predetermined behaviour imply that the UE assumes that the next gap is "on", whereby it performs measurement during the entire gap.

The UE may also report events or results pertaining to unreliable events (or unreliable gap commands) to the network, which in turn takes some corrective measures such as increase transmit power, congestion control, etc.

It is an advantage of the present invention that the UE behaviour is specified in case of receiving unreliable gap commands, whereby unstable behaviour in the network is decreased.

It is a further advantage of the present invention that HARQ transmissions will not be lost due to the reception of unreliable gap command.

It is still another advantage of an embodiment of the present invention that the network is able to take appropriate action (e.g. adjusts transmit power etc) when gap commands are repeatedly received as unreliable.

A further advantage is that the embodiment concerning non-static gaps (semi-dynamic or fully dynamic) provides such a flexibility that would ensure that at least HARQ retransmissions are not delayed due to gaps. As stated above, due to unreliable behaviour in the prior art solutions not only HARQ transmissions and retransmissions are delayed but they can even be lost over the air (waste of resources).

Further objectives, features, aspects and advantages of the present invention will appear from the following detailed disclosure, from the attached dependent claims as well as from the drawings.

BRIEF DESCRIPTION OF THE DRAWINGS

Exemplifying embodiments of the invention will now be described in more detail with reference to the accompanying schematic drawings.

DETAILED DESCRIPTION

Figure 1:
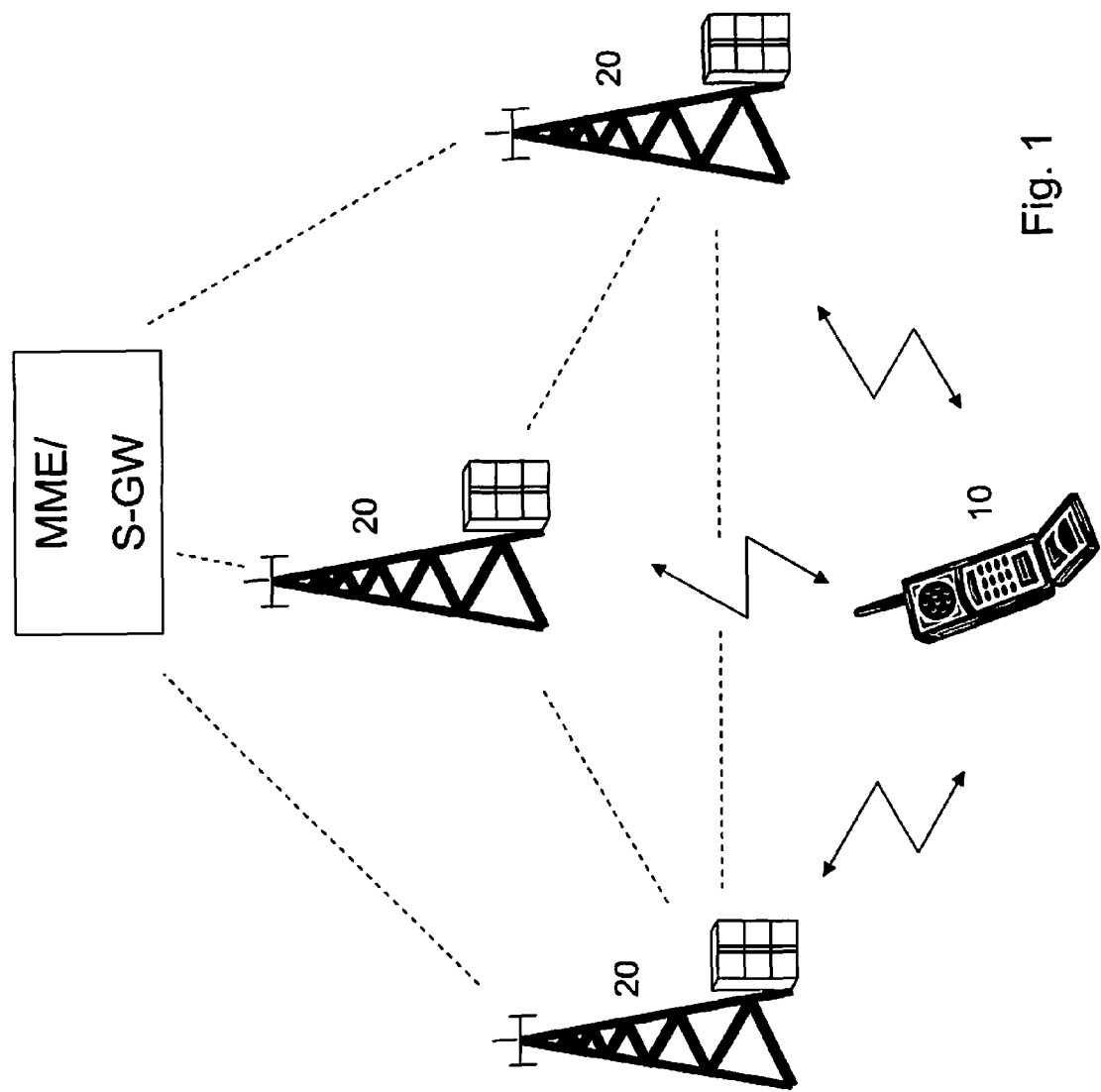
FIG. 1 schematically illustrates the general architecture in which embodiments of the invention can be used.
Figure 2:
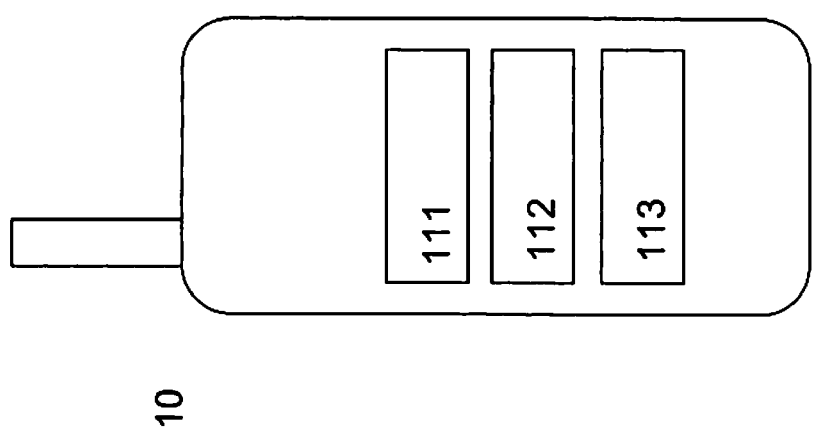
FIG. 2 schematically illustrates a user equipment for which embodiments of the invention can be used.

FIG. 1 shows the general architecture in which embodiments of the invention may be used. A mobile station 10, or user equipment (UE), is located within the coverage of a mobile communications network. The UE communicates with base stations 20, or E-UTRAN NodeB:s (eNBs) in the case of LTE, which provides wireless network coverage for a particular coverage area commonly referred to as a cell. The eNBs 20 are interconnected, and are also connected to the EPC (Evolved Packet Core), and more specifically to the MME (Mobility Management Entity) and to the Serving Gateway (S-GW). Radio Resource Control (RRC) terminates in eNB 20, and measurement configuration is done via RRC, which resides in eNB 20. FIG. 2 schematically shows a UE 10 that comprises standard wireless device components, such as an antenna arrangement, radio equipment, a logic unit that can be implemented for instance as a microprocessor, a CPU, or similar processing or computer means, as well as some kind of data storage unit or memory unit. The skilled person will realize that a user equipment 10 comprises these and other components, and they will therefore not be described further in this application. The UE 10 in FIG. 2 comprises means 111 for receiving signalling gap commands, means 112 for determining whether a received gap command is reliable or unreliable, and means 113 for performing downlink measurements in accordance to a predefined rule, in case the received gap command is determined as unreliable.

Figure 3:
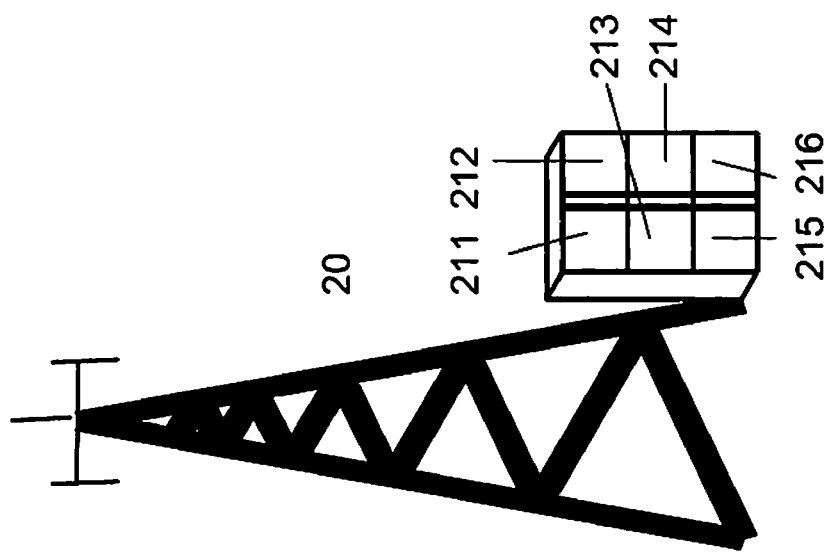
FIG. 3 schematically illustrates a radio base station for which embodiments of the invention can be used.

FIG. 3 schematically shows a network radio base station 20 that may be used in connection with the present invention. It comprises standard radio base station components, such as network interfaces, an antenna arrangement, radio equipment, a logic unit that can be implemented for instance as a microprocessor, a CPU, or similar processing or computer means, as well as some kind of data storage unit or memory unit. The radio base station 20 in FIG. 3 comprises means 211 for configuring idle gaps in a UE, means 212 for sending gap commands, means 213 for configuring a UE for specifying correct behaviour when the received gap commands are unreliable. It also comprises means 214 for configuring a UE 10 to be able to report results or events pertaining to unreliable commands. Furthermore, means 215 for performing one or more actions to improve the reliability of the received gap commands in response to the results or events reported by the UE 10 are comprised. According to embodiments of the invention such actions are radio resource management actions. Also, the radio base station 20 comprises means 216 for detecting autonomously that the transmitted gap commands are received unreliably by the UE 10 without explicit reports from the UE 10.

The invention determines whether a signaling gap command used to activate or deactivate idle gaps for downlink measurements in the neighbour cells transmitted from the network to the UE 10 is reliable or unreliable. If it is determined that the signaling gap command is unreliable, the downlink measurements are performed in accordance with a predefined rule according to the present invention.

According to embodiments of the invention, on/off commands can also be used to start and/or stop the entire idle gap pattern. Such gap commands, or gap pattern commands, regarding an entire gap pattern are received in the user equipment. The base station may send the on/off command to the user equipment to activate and/or deactivate the idle gap pattern, whereby the user equipment is configured for specifying a predetermined behaviour when the received gap pattern commands are unreliable. In such a case the gap pattern on/off command will be sent via the MAC layer or via the downlink physical layer control channel. An advantage is that it is quicker than the conventional way of activating/deactivating an entire pattern via RRC signalling, since gaps can be activated or deactivated in just one or a few time slots, e.g. 0.5 ms or maximum 1 ms. The swift activation and deactivation of gap patterns would speed up the measurement process and reduce throughput loss, respectively.

Figure 4:
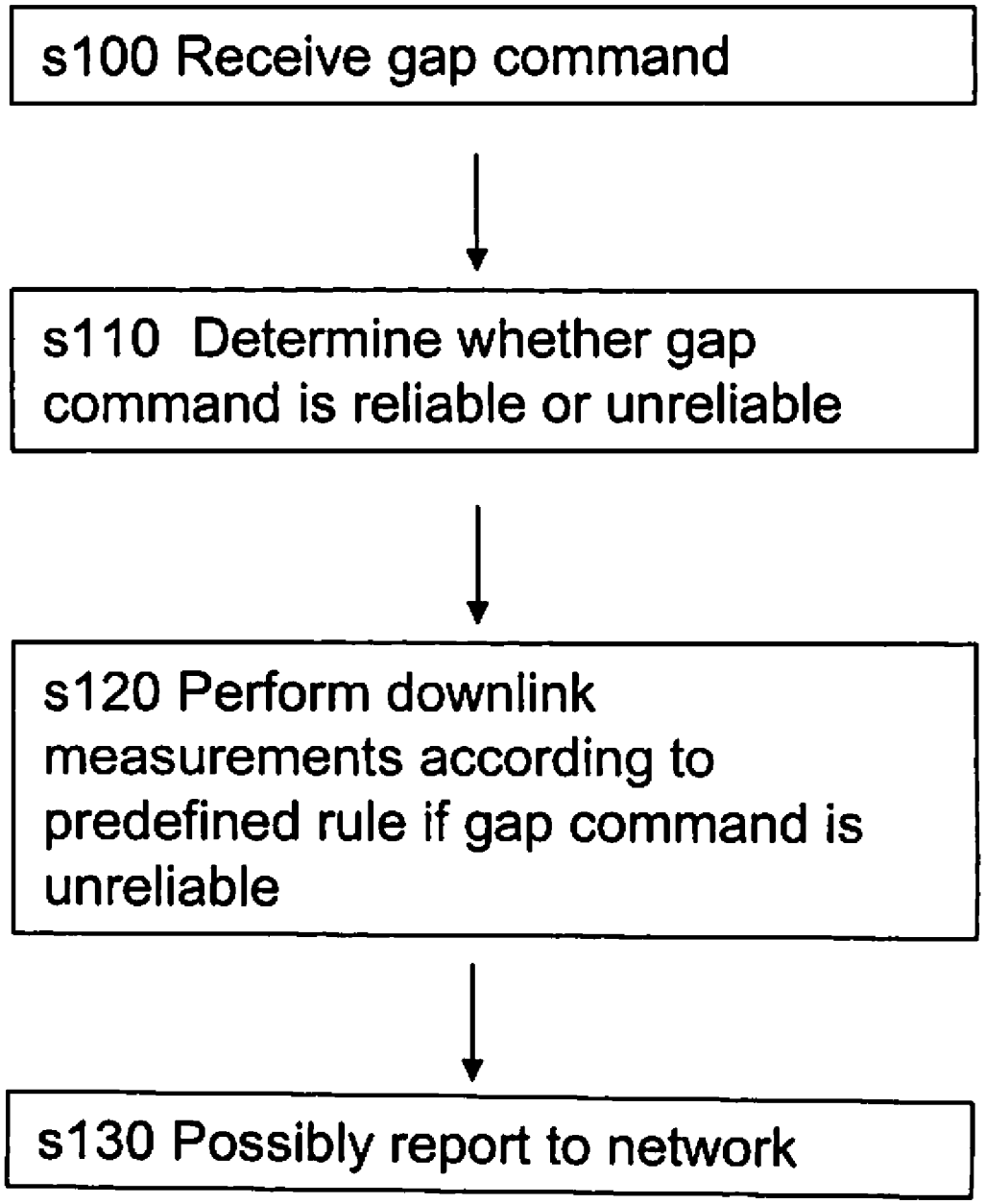
FIG. 4 illustrates a block diagram of the general flow of a method in a user equipment according to an embodiment of the invention.

FIG. 4 shows steps of a method in a UE 10 that are carried out according to embodiments of the invention. First, the UE 10 receives signalling gap commands in s100. In s100 the UE 10 then determines whether the received gap command is reliable or unreliable. In case the received gap command is determined as unreliable, the UE 10 performs downlink measurements in accordance with a predefined rule in s120. In s130 the UE 10 also has the possibility to report an event in case of receiving several unreliable gap commands during a certain time period.

Figure 8:
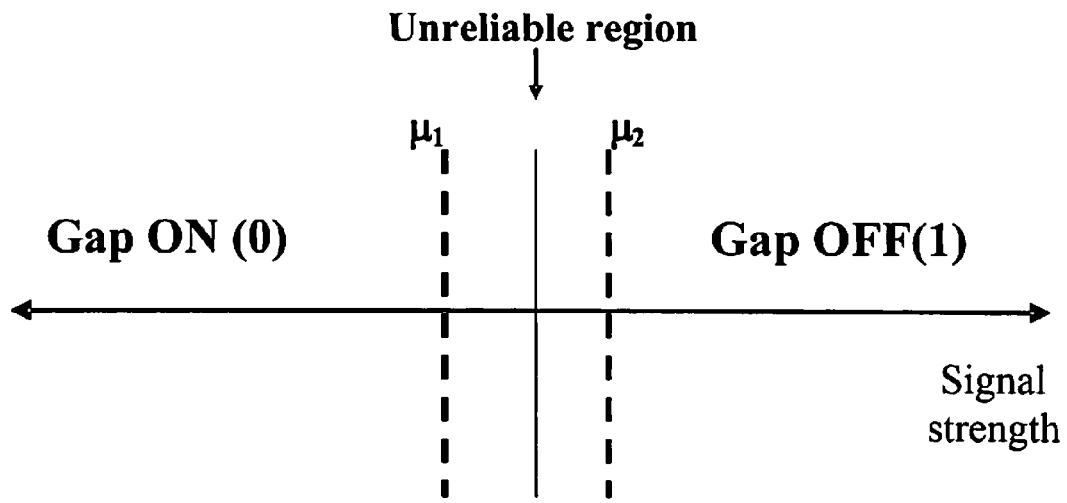
FIG. 8 illustrates an unreliability region that is determined by thresholds.
Figure 9:
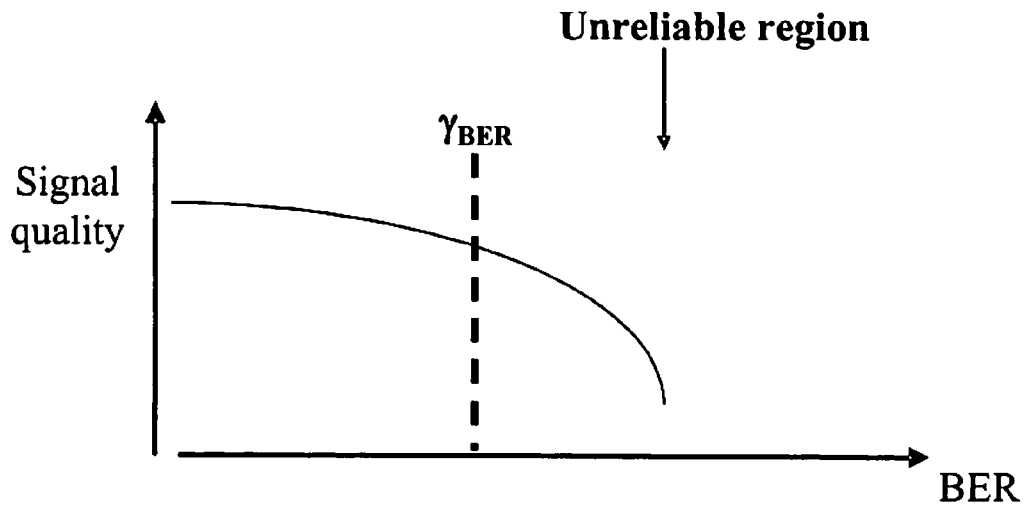
FIG. 9 illustrates an unreliability region that is based on a BER target threshold.

Thus, the UE 10 needs to check whether a received gap command is reliable or unreliable. The UE 10 must check the reliability of each and every gap command. FIG. 8 illustrates one simple mechanism of reliability checking. The command is unreliable in case it its received signal strength is between lower ($\mu_1$) and upper ($\mu_2$) thresholds. Another possibility, which is illustrated in FIG. 9, is to map the measured quality of the received command onto a certain bit error (BER) rate based on some pre-defined lookup table. The received gap command is considered to be unreliable in case the mapped BER is larger than the specified threshold level ($\gamma_{BER}$). The exact algorithm that determines unreliability of the received command is generally implementation dependent but in some cases it can partly be specified such as BER target etc. Reliability checking and appropriate behaviour are ensured by a test case.

If it is determined that a received gap command is unreliable, then the downlink measurements should according to the present invention be performed in accordance with a predefined rule.

In accordance with embodiments of the invention, there are the following (possibly) mutually exclusive predefined rules, which will be discussed in the following detailed description:
According to a first embodiment of the present invention the UE 10 skips the gap, i.e. no downlink measurements are performed during the next gap;
According to a second embodiment, the UE 10 partly skips the gap, i.e. it may perform downlink measurements after time $T_0$;
According to a third embodiment, the UE 10 considers the next gap for downlink measurements.

Figure 10:
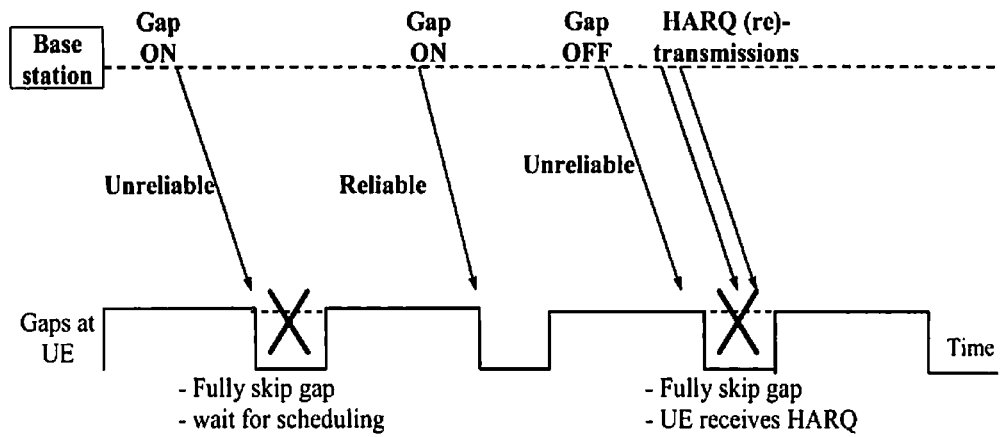
FIG. 10 illustrates a first embodiment of the present invention.

According to the first embodiment, the UE 10 detects an unreliable gap command and completely skips the next gap and awaits instead a scheduling command from the network as shown in FIG. 10. The main advantage of this solution is that HARQ transmissions will not be lost and there will not be any wastage of downlink transmission resources since UE 10 will be able to receive the data.

Figure 11:
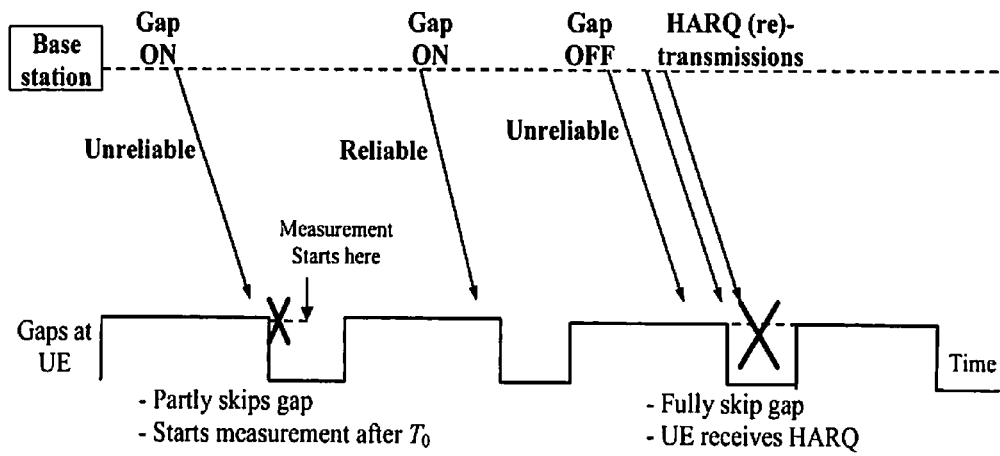
FIG. 11 illustrates a second embodiment of the present invention.

According to the second embodiment, which is exemplified in FIG. 11, the UE 10 partly skips the gap: As stated before the gap can be typically between 2 ms and 10 ms long depending on the number of measurements (e.g. number of cells) to be performed and the desired measurement reporting delay. A longer gap (e.g. between 8 ms and 10 ms) would be inefficiently used (i.e. no measurements) in response to unreliable gap command if the UE 10 neither performs any measurement nor receives any HARQ transmission.

When the UE 10 receives an unreliable gap command, it sets a gap activation timer (or counter) ($T_0$) in the order of number of TTIs according to the second embodiment. Another possibility is to reset the timer after the UE 10 has been scheduled during the gap. Until the expiration of the timer the UE 10 skips the gap and waits for the data transmission from the network. After the expiration of the timer the UE 10 starts the measurement, provided it has not already been scheduled during time $T_0$. This is because the network is likely to schedule just after the start of the gap. If the UE 10 is not scheduled within the time $T_0$, it may assume that the network sent a gap "on" command. This embodiment implies the advantage that the UE 10 can use at least a part of the gap more efficiently.

The behaviour of the network can be specified, e.g., by scheduling a user immediately after sending the gap "off" command. The timer value should be settable by the network, e.g. via RRC signaling. The network can use the timer option in case of long gaps. In case the timer value is set to a very large value (larger than the gap length), the solution becomes similar to embodiment to fully skip the gap, which has been described above.

Figure 12:
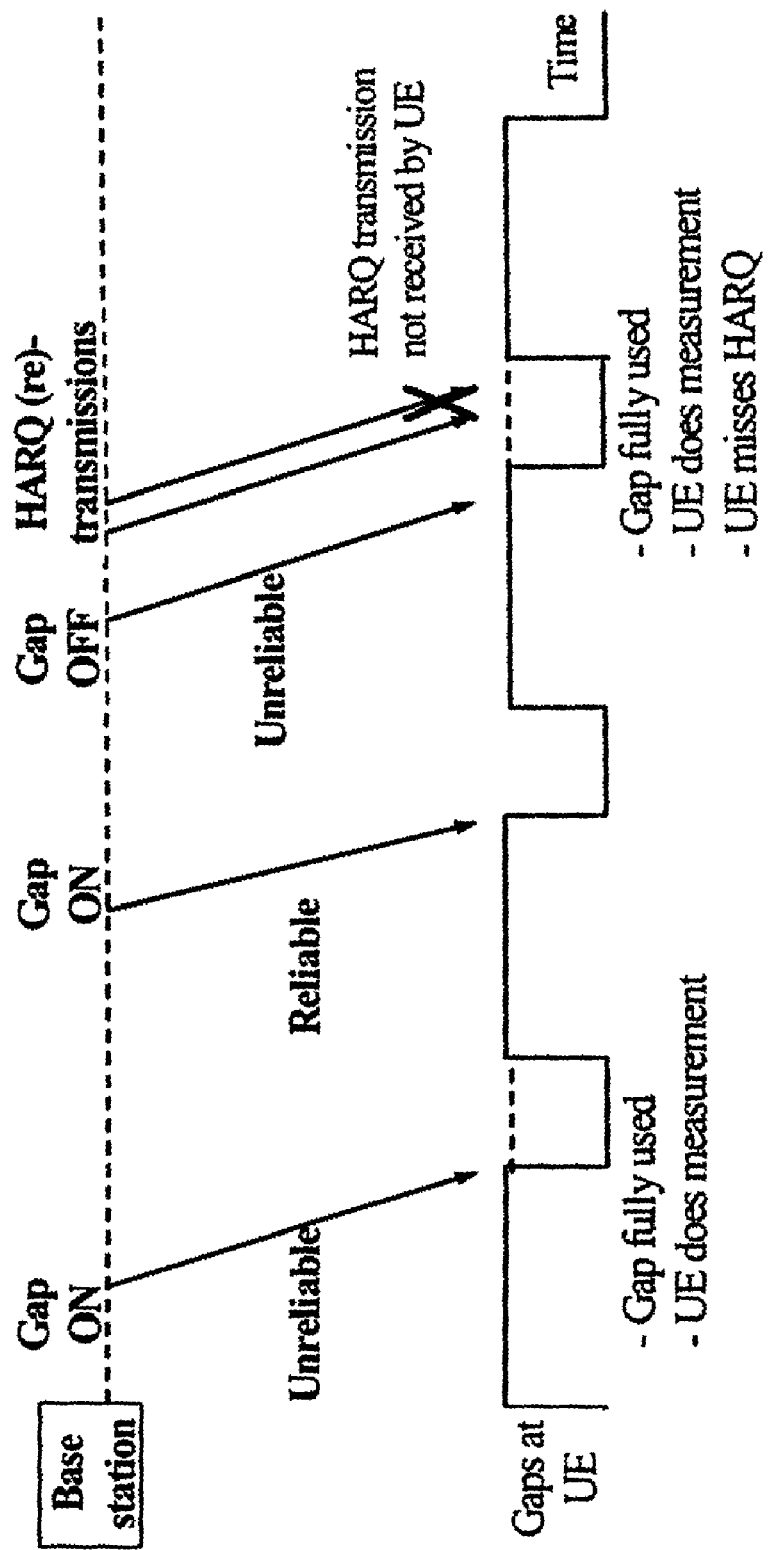
FIG. 12 illustrates a third embodiment of the present invention.

The third embodiment, which is exemplified in FIG. 12, uses the gaps fully for measurements and is the converse embodiment to the first embodiment (i.e. gap fully skipped). In case of unreliably received gap command, the UE 10 will perform measurements in the entire next gap. This means that the measurement reports will not be delayed.

Figure 5:
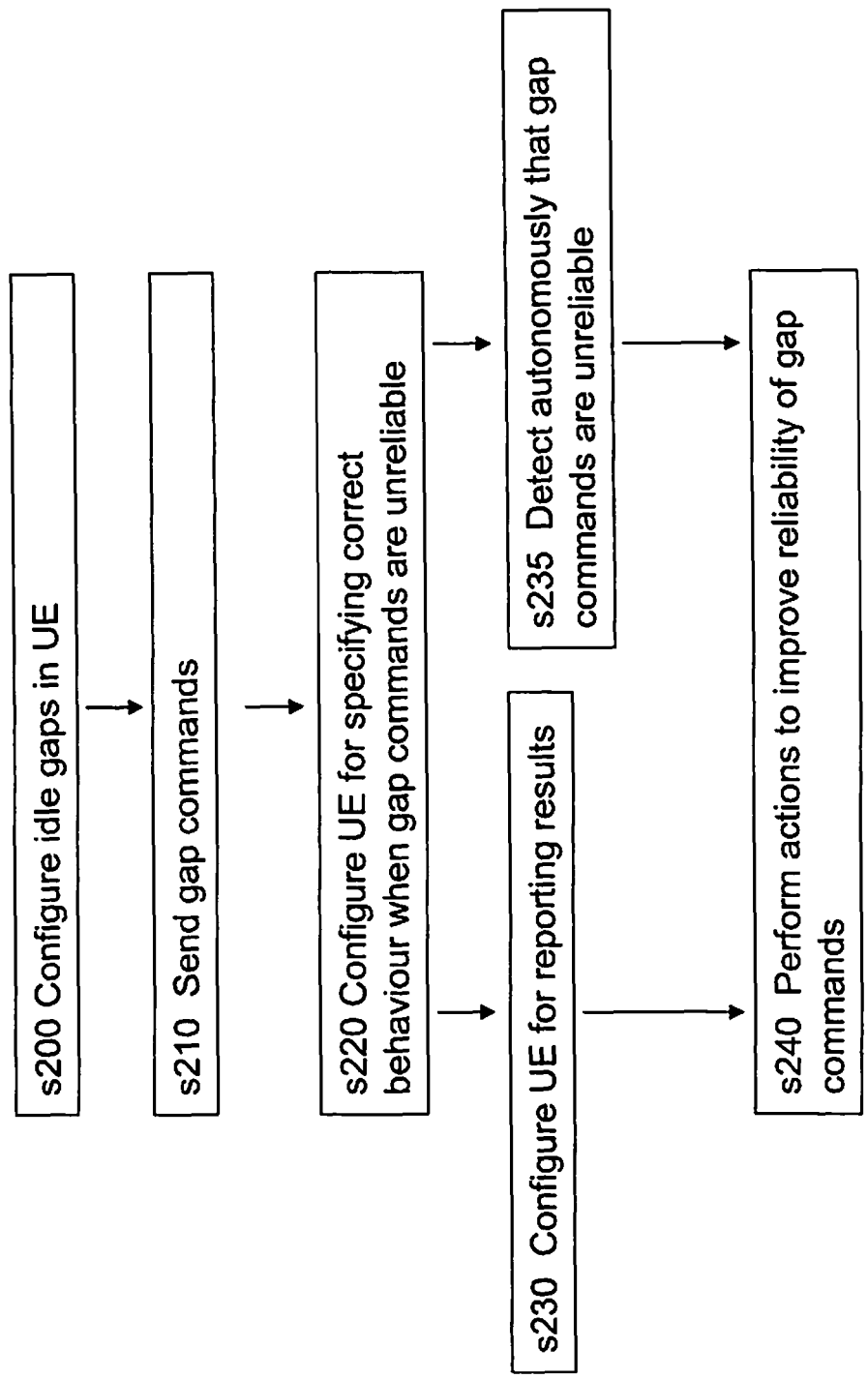
FIG. 5 illustrates a block diagram of the general flow of a method in a base station according to an embodiment of the invention.
Figure 6:
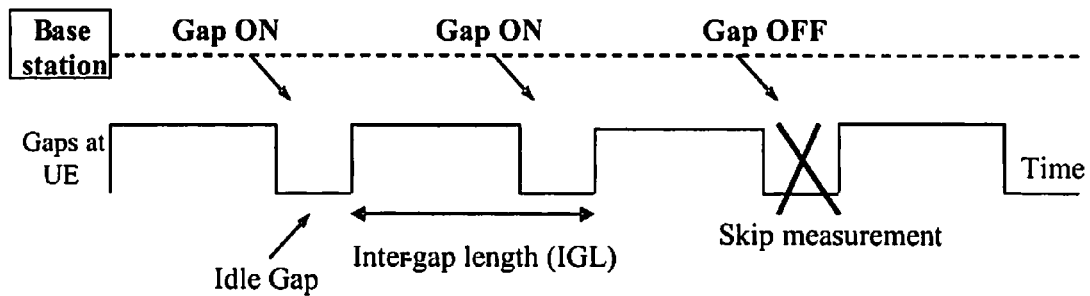
FIG. 6 illustrates the principles of semi-dynamic gap patterns.
Figure 7:
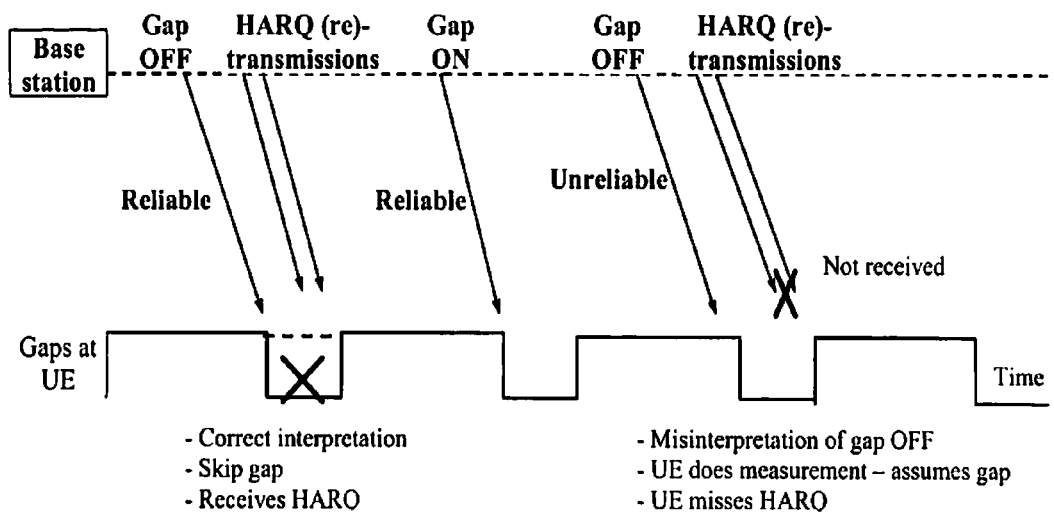
FIG. 7 illustrates the impact of a misinterpretation of unreliable idle gap commands.

According to embodiments of the invention, a method in a radio base station 20 comprises the following steps, which are illustrated in FIG. 5. First, the radio base station 20 configures idle gaps in a UE 10 in s200. In s210, the radio base station 20 sends gap commands to the UE 10. The UE 10 is then configured for specifying correct behaviour when the gap commands are unreliable in s220. s230 and s235 shows two steps which can be carried out separately or in combination. In s230 the UE 10 is configured to be able to report results or events pertaining to unreliable commands. In s235 the radio base station 20 autonomously detects that the transmitted gap commands are received unreliably. Based on this the radio base station 20 in s240 performs actions to improve the reliability of transmitted gap commands.

The following section deals with the reporting of events concerning unreliable gap commands and discloses two possible methods, an explicit method based on UE 10 reports and an implicit method. Irrespective which method is used to specify UE behaviour when receiving unreliable gap commands, it is advantageous that UE 10 reports unreliable events to the network. This could be either:

The Number of unreliable gap commands received over time period $T_1$, where $T_1$ is a network configurable parameter;

An event indicating that at least N consecutive gap commands are unreliable, where N is settable by the network;

An event indicating that at least M gap commands are unreliable during time $T_2$, where $T_2$ and M are network configurable parameters.

In response to an event reporting the network will take appropriate radio resource management action, which may include, e.g. increase of the transmit power level, congestion control to reduce interference, or, in the worst case, a cell change, etc. This information can also be used for operational and maintenance purpose, i.e. for long term network planning to set correct transmission power levels, cell size dimensioning, etc. One or more of these actions could be performed by eNBs 20.

The event reporting described above explicitly notifies the network about the unreliable reception of gap commands. However, this requires some signalling overheads used for event reporting in the uplink. In some cases network can itself infer that the gap commands sent by UE 10 are unreliable, without any event reporting. For instance, in the embodiment where a gap is fully skipped the fact that the measurement reporting delay is longer than expected could implicitly imply that the UE 10 has omitted some gaps due to unreliable commands. The network can then take an appropriate radio resource management action, e.g. increase transmitted power level, etc. Similar arguments can be used for the embodiment where gaps are partly skipped. In the embodiment where gaps are fully used, the network can presume that the received gap commands are unreliable if the network does not repeatedly receive any UE response (e.g. ACK or NACK) during those gaps where the UE 10 is scheduled.

The above described embodiments of the invention are intended to be examples only. Alterations, modification, and variations may be effected to particular embodiments by those skilled in the art without departing from the scope of the invention, which is defined by the accompanying claims.

The invention claimed is:

1. A method performed by a user equipment located in a cell of a mobile telecommunication network, the method comprising:
    receiving signaling gap commands used to activate or deactivate idle gaps during which the user equipment performs downlink measurements on neighbor cells;
    determining whether a received gap command is reliable or unreliable; and
    if the received gap command is determined to be unreliable, performing the downlink measurements in accordance with a predefined rule.

2. The method of claim 1 wherein the gap command is determined to be unreliable if a signal strength of the received gap command lies between two predefined threshold values.

3. The method of claim 1 wherein the gap command is determined to be unreliable if a bit error rate of the received gap command is larger than a predefined threshold.

4. The method of claim 1 wherein the predefined rule configures the user equipment to:
    not perform the downlink measurements during an idle gap that corresponds to the received gap command determined to be unreliable; and
    prepare to receive scheduled data from a base station during the corresponding idle gap.

5. The method of claim 1 wherein the predefined rule configures the user equipment to:
    perform the downlink measurements during an idle gap that corresponds to the received gap command determined to be unreliable; and
    not receive data from a base station during the corresponding idle gap.

6. The method of claim 1 wherein the predefined rule configures the user equipment to:
    start a timer at a beginning of an idle gap that corresponds to the received gap command determined to be unreliable; and
    until the timer expires, not perform the downlink measurements, and prepare to receive data from a base station during the corresponding idle gap.

7. The method of claim 6 wherein the predefined rule further configures the user equipment to perform the downlink measurements during the corresponding idle gap after the timer expires.

8. The method of claim 1 further comprising reporting an event responsive to receiving a plurality of unreliable gap commands in a predetermined time period.

9. The method of claim 1 further comprising:
    determining the number of unreliable gap commands received over a predetermined time period; and
    reporting the corresponding results to a base station.

10. The method of claim 8 wherein reporting an event comprises reporting an event to the base station indicating that at least N consecutive received gap commands have been determined to be unreliable.

11. The method of claim 8 wherein reporting an event comprises reporting an event to the base station indicating that at least M gap commands have been determined to be unreliable during the predetermined time period.

12. A method performed by a radio base station operating in a cell of a mobile telecommunication network, the method comprising:
    configuring idle gaps for use by a user equipment in performing downlink measurements;
    sending gap commands to the user equipment indicating whether the user equipment should receive data, or perform the downlink measurements, during the idle gaps that correspond to the gap commands; and configuring the user equipment to perform a predetermined function when the user equipment determines that received gap commands are unreliable.

13. The method of claim 12 further comprising configuring the user equipment to report results or events associated with the user equipment receiving unreliable gap commands.

14. The method of claim 12 further comprising performing one or more actions to improve a reliability of the gap commands received at the user equipment responsive to receiving the results or events reported by the user equipment.

15. The method of claim 12 further comprising:
autonomously detecting that the user equipment received the transmitted gap commands unreliably without having received an explicit report from the user equipment; and performing one or more actions to improve the reliability of the transmitted gap commands.

16. The method of claim 12 further comprising configuring a timer located at the user equipment to cause the user equipment to:
start the timer at a beginning of an idle gap corresponding to a gap command determined to be unreliable; and
until the timer expires, not perform the downlink measurements and prepare to receive data from a base station during the corresponding idle gap.

17. The method of claim 12 further comprising providing the user equipment with a predetermined time period during which the user equipment detects unreliable gap commands, and reports the results to a base station.

18. The method of claim 12 further comprising configuring an event for the user equipment to report if the user equipment receives N consecutive unreliable gap commands.

19. The method of claim 12 further comprising configuring an event for the user equipment to report if the user equipment receives N unreliable gap commands over a predetermined time period.

20. The method of claim 15 further comprising autonomously determining whether the gap commands received at the user equipment are reliable or unreliable.

21. The method of claim 20 wherein autonomously determining whether the received gap commands are unreliable comprises comparing a delay of the measurement reported by the user equipment with an expected measurement delay according to used idle gaps.

22. The method according to claim 20 wherein autonomously determining whether the received gap commands are unreliable comprises monitoring for a missing acknowledgement, or expected feedback information, from the user equipment.

23. The method of claim 12 further comprising initiating one or more measures to improve the reliability of the gap commands.

24. The method of claim 23 wherein the measures include one or more of increasing a transmitted power of the gap commands, reducing a load in the cell, and performing congestion control.

25. The method of claim 24 further comprising performing a handover if the one or more improvement measures are not successful.

26. A user equipment located in a cell of a mobile telecommunication network, the user equipment configured to receive signaling gap commands used to activate or deactivate idle gaps during which the user equipment performs downlink measurements on neighbor cells, the user equipment comprising:

a logic unit configured to:
determine whether a received gap command is reliable or unreliable; and
perform downlink measurements in accordance with a predefined rule if the received gap command is determined to be unreliable.

27. The user equipment of claim 26 wherein the logic unit is further configured to determine that the gap command is unreliable if a signal strength of the received gap command lies between two predetermined threshold values.

28. The user equipment of claim 26 wherein the logic unit is further configured to determine that the gap command is unreliable if a bit error rate of the received gap command exceeds a predetermined threshold.

29. The user equipment of claim 26 wherein the predefined rule defines that the user equipment will not perform the downlink measurements during an idle gap that corresponds to the received gap command, and will prepare to receive scheduled data from a base station during the corresponding idle gap.

30. The user equipment of claim 26 wherein the predefined rule defines that the user equipment will perform the downlink measurements during an idle gap that corresponds to the received gap command, and not receive data from the base station during the corresponding idle gap.

31. The user equipment of claim 26 wherein the predefined rule defines starting a timer at a beginning of an idle gap that corresponds to the gap command determined to be unreliable, and not performing downlink measurements until the expiration of the timer, and preparing to receive scheduled data from the base station during the corresponding idle gap.

32. The user equipment of claim 31 wherein the predefined rule further defines that the user equipment will perform the downlink measurement after the expiration of the timer during the corresponding gap.

33. The user equipment of claim 26 wherein the logic unit is further configured to report an event if the user equipment receives a plurality of unreliable commands in a predetermined time period.

34. The user equipment of claim 26 wherein the logic unit is further configured to:
measure the number of unreliable gap commands received at the user equipment over a predetermined time period; and
report the corresponding results to a base station.

35. The user equipment of claim 33 wherein the logic unit is further configured to report an event to the base station indicating that at least N consecutive gap commands have been determined to be unreliable.

36. The user equipment of claim 33 wherein the logic unit is further configured to report an event to the base station indicating that at least M gap commands have been determined to be unreliable during a predetermined time period.

37. A radio base station operating in a cell of a mobile telecommunication network, the radio base station comprising:

a logic unit configured to:
configure idle gaps used by a user equipment in the cell to perform downlink measurements;
send gap commands indicating whether the user equipment should receive data, or perform downlink measurements, during a corresponding idle gap; and
configure the user equipment to perform a predefined function when the gap commands received by the user equipment are determined to be unreliable.

38. The radio base station of claim 37 wherein the logic unit is further configured to configure the user equipment to send report results or events indicating that the user equipment received gap commands that it determined to be unreliable.

39. The radio base station of claim 37 wherein the logic unit is further configured to perform one or more actions to improve a reliability of the gap commands received at the user equipment responsive to receiving the results or events reported by the user equipment.

40. The radio base station of claim 37 wherein the logic unit is further configured to:
  autonomously detect that the gap commands received by the user equipment are unreliable without receiving reports from the user equipment indicating that the received gap commands are unreliable; and
  perform one or more actions to improve reliability of the transmitted gap commands.

41. The radio base station of claim 37 wherein the logic unit is further configured to configure a timer located at the user equipment, and to configure the user equipment to:
  start the timer at a beginning of a given idle gap; and
  until the timer expires, not perform the downlink measurements, and prepare to receive scheduled data from a base station during the given idle gap.

42. The radio base station of claim 38 wherein the logic unit is further configured to provide the user equipment with a predetermined time period over which the user equipment can measure the gap commands it receives, and report the gap commands that were received unreliably.

43. The radio base station of claim 38 wherein the logic unit is further configured to configure an event for the user equipment to report if the user equipment determines that it has received N consecutive unreliable gap commands.

44. The radio base station of claim 38 wherein the logic unit is further configured to configure an event for the user equipment to report if the user equipment determines that it has received N unreliable gap commands over a predetermined time period.

45. The radio base station of claim 40 wherein the logic unit is further configured to autonomously detect that the gap commands received by the user equipment are unreliable by comparing a delay of a measurement reported by the user equipment with an expected measurement delay according to used idle gaps.

46. The radio base station of claim 40 wherein the logic unit is further configured to autonomously detect that the gap commands received by the user equipment are unreliable by monitoring for a missing acknowledgement or expected feedback information from the user equipment.

47. The radio base station of claim 40 wherein the logic unit is further configured to initiate performing one or more improvement measures to improve a reliability of the received gap commands.

48. The radio base station of claim 47 wherein the one or more improvement measures include at least one or more of increasing the transmit power used to transmit the gap commands, reducing a load in the cell, and performing congestion control.

49. The radio base station of claim 48 wherein the logic unit is further configured to perform a handover of the user equipment if the one or more improvement measures are not successful.

50. A method performed at a radio base station operating in a mobile telecommunication network cell, the method comprising:
  configuring idle gaps in a user equipment in the cell to perform downlink measurements;
  sending gap commands to the user equipment indicating whether the user equipment should receive data, or perform downlink measurements, during the corresponding gap;
  configuring the user equipment to perform one or more predefined functions when the user equipment receives gap commands that it determines are unreliable;
  configuring the user equipment to report results or events indicating that the user equipment has received gap commands that it determines are unreliable; and
  performing one or more actions to improve reliability of the gap commands received at the user equipment responsive to receiving the results or events reported by the user equipment; and
  autonomously detecting that the gap commands transmitted to the user equipment are received unreliably by the user equipment without receiving an explicit report from the user equipment, and performing one or more actions to improve the reliability of the transmitted gap commands.

51. A user equipment located in a cell of a mobile telecommunication network, the user equipment configured to receive signaling gap commands used to activate or deactivate idle gaps during which the user equipment performs downlink measurements on neighbor cells, the user equipment comprising:
  means for determining whether a received gap command is reliable or unreliable; and
  means for performing downlink measurements in accordance with a predefined rule if the received gap command is determined to be unreliable.

52. A radio base station operating in a cell of a mobile telecommunication network, the radio base station comprising:
  means for configuring idle gaps used by a user equipment in the cell to perform downlink measurements;
  means for sending gap commands indicating whether the user equipment should receive data, or perform downlink measurements, during a corresponding idle gap; and
  means for configuring the user equipment to perform a predefined function when the gap commands received by the user equipment are determined to be unreliable.

* * * * *

UNITED STATES PATENT AND TRADEMARK OFFICE
CERTIFICATE OF CORRECTION

| | | |
|---|---|---|
| PATENT NO. | : 8,270,340 B2 | |
| APPLICATION NO. | : 12/520099 | |
| DATED | : September 18, 2012 | |
| INVENTOR(S) | : Kazmi | |

It is certified that error appears in the above-identified patent and that said Letters Patent is hereby corrected as shown below:

In Column 7, Line 56, before "the UE" delete "s100" and insert -- s110 --, therefor.

Signed and Sealed this
Twenty-second Day of January, 2013

David J. Kappos
*Director of the United States Patent and Trademark Office*